UNITED STATES PATENT OFFICE.

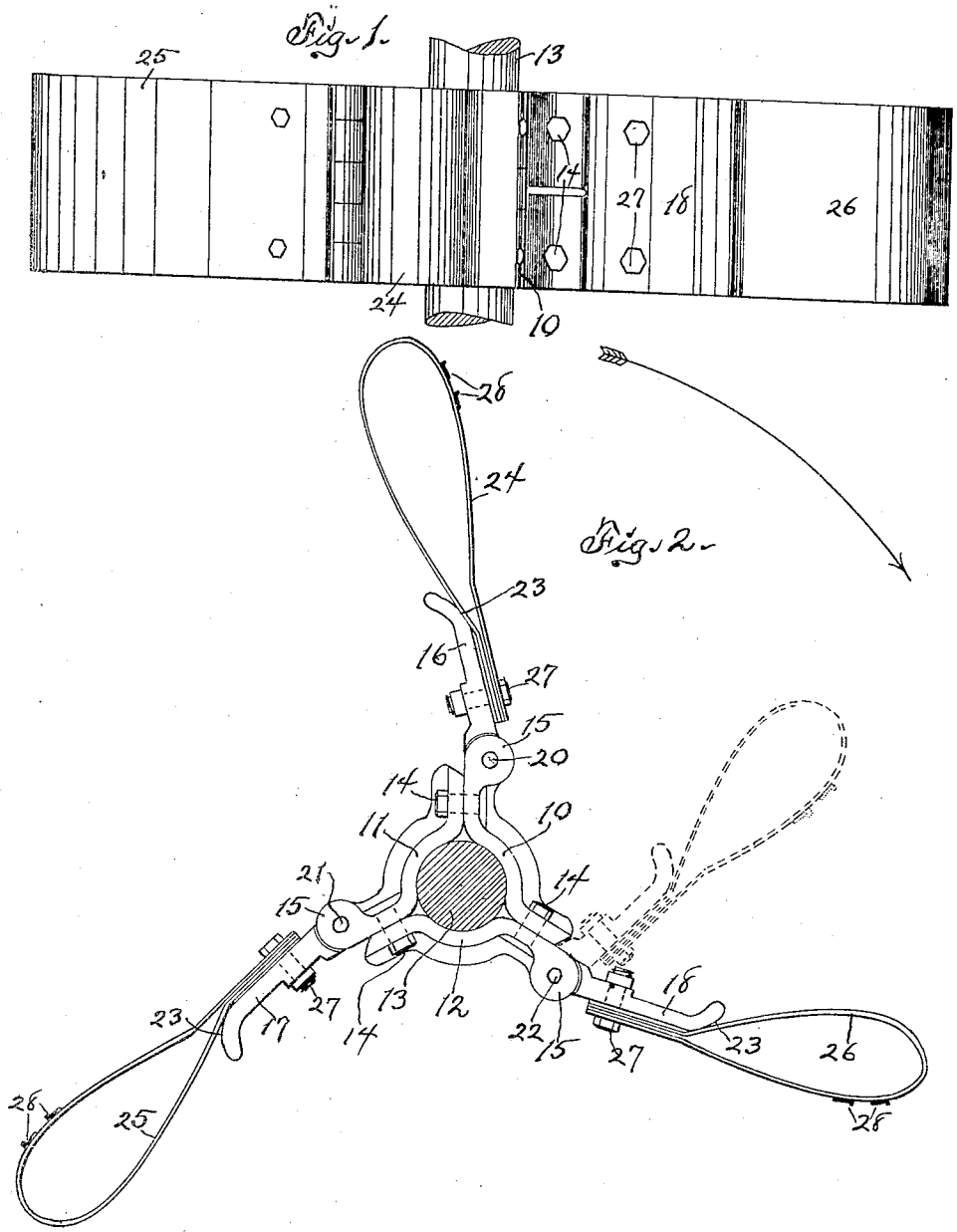

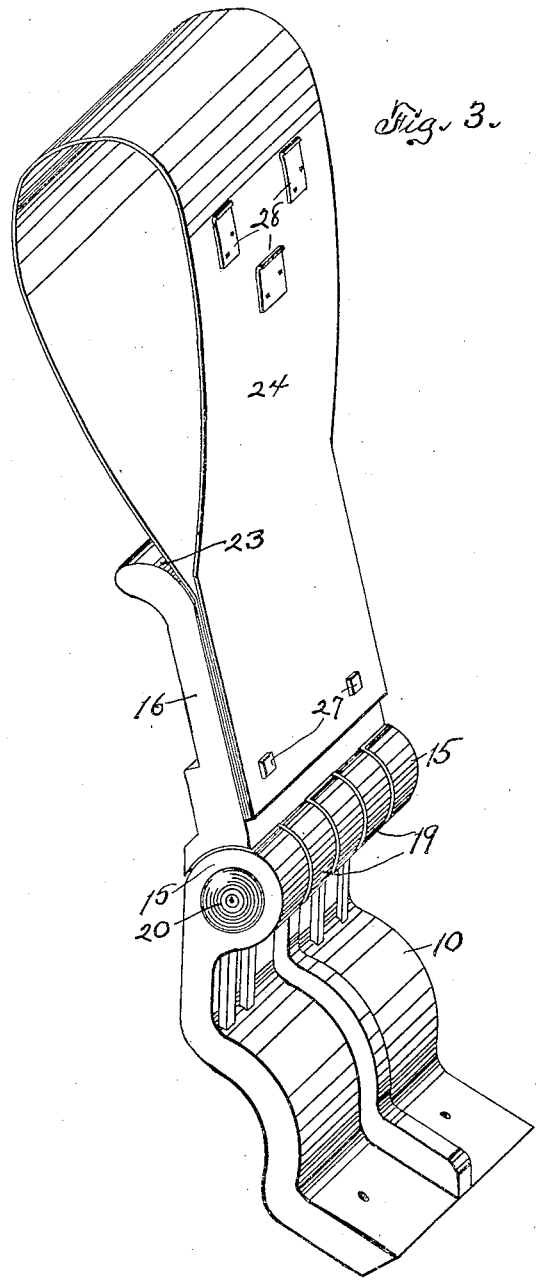

FRANK G. CARPENTER, OF SIOUX CITY, IOWA.

HOG-BEATER SHAFT ATTACHMENT.

1,336,887.  Specification of Letters Patent.  Patented Apr. 13, 1920.

Application filed December 23, 1919. Serial No. 346,980.

*To all whom it may concern:*

Be it known that I, FRANK G. CARPENTER, a citizen of the United States of America, and resident of Sioux City, Woodbury county, Iowa, have invented a new and useful Hog-Beater Shaft Attachment, of which the following is a specification.

The object of this invention is to provide improved means for mounting hog-beaters on a driven shaft in dehairing machines, for the purpose of economizing in the use of and conserving said beaters and at the same time obtaining better results in the way of minimizing damage to the skin of a hog during the operation of dehairing.

My invention consists in the construction, arrangement and combination of elements hereinafter set forth, pointed out in the claims and illustrated by the accompanying drawings, in which—

Figure 1 is a plan and Fig. 2 an end elevation, partly in section, showing my improved devices mounted on a shaft for practical use. Fig. 3 is a detail isometric of parts of the device separated from other parts and the shaft.

This invention and construction relates to and is an improvement in that class of machines and devices employed to remove hair from a slaughtered hog, the carcass being carried between banks of driven shafts, drenched with scalding water, and beaten with devices carried by said shafts, of which the patents to Kohlhepp, 720,702, February 17, 1903, and 971,049, September 27, 1910, may serve as examples. Machines constructed according to the patents above noted are now in general use, and they employ as beaters looped sections of canvas or rubber belting carried in radial positions on sectional drums clamped to a driven shaft. In use, the beaters become damaged and rapidly deteriorate from two causes, viz., frequent and rapid flexing relative to the operations of the drums on which they are carried, and the effect of the hot water contacting with the beaters. Also, the hide of the hog is damaged by too rigid mounting of the beaters on the drums, resulting in too unyielding contact with the closer portions of the carcass. To avoid all the objections and damages above noted, I provide a hinge between each beater and the driven shaft carrying it, to compensate for the flexing of the beater coincident with each contact of the beater with a hog and also place more dependence on centrifugal action than on rigid radial relation of the beaters in applying the successive blows.

In the construction of the means as shown, the numerals 10, 11 and 12 designate counterpart drum sections or members adapted to be arranged in sequence around a driven shaft 13 and be clamped thereto by means of bolts 14 extending through parallel end portions thereof, which parallel end portions preferably are arranged substantially radially of said shaft. Spaced ears 15 are formed on one end of each of the members 10, 11 and 12 and beater-supporting plates 16, 17 and 18, of counterpart construction and each formed with spaced ears 19, are mounted in such manner that the ears 19 alternate with and overlap the ears 15 and are pivoted thereto by means of hinge-pins 20, 21 and 22. The outer end portion of each beater-supporting plate is curved laterally in trailing relation to the direction of travel thereof as indicated by the arrow in Fig. 2, thus presenting a convex face 23 on its forward side. Beaters 24, 25 and 26, each formed of a looped section of canvas or rubber belting, or other suitable material, are arranged with parallel end portions in superposed relation to the forward faces of the plates 16, 17 and 18 and are secured to said plates by bolts 27. Looped portions of the beaters project beyond the plates and, in the rotation of the shaft as indicated, move through a variable orbit dependent on the speed of the shaft and retarding influence of a carcass engaged thereby. The beaters may be equipped with angle plate 28, in any suitable locations, if desired to assist the beaters to remove hair from the carcass. In use, the beater-supporting plates articulate on the hinge connections with the drum sections and the beaters flex over and in contact with the convex surfaces 23 of said plates. The articulating and flexing both contribute to tempering the blows of the beaters, and the convex surfaces 23 of the plates temper and regulate the flexing of the beaters and avoid abrupt bending thereof, which would cause the beaters to crack, break and disintegrate rapidly at the points or on the lines of flexing.

Any suitable construction may be employed to provide a free hinge between the beater and shaft or to temper the flexing of the beater.

I claim as my invention—

1. In a hog-beater shaft attachment, the combination with a driven shaft and drum elements mounted thereon, of plates hinged to said drum elements and beaters carried by said plates.

2. In a hog-beater shaft attachment, the combination with a driven shaft of supporting elements carried by said shaft and adapted to articulate relative thereto, and beaters on said supporting elements.

3. In a hog-beater shaft attachment, the combination with a driven shaft of supporting elements carried by said shaft and adapted to articulate relative thereto, and beaters on said supporting elements and adapted to flex relative thereto.

4. In a hog-beater shaft attachment, the combination with a driven shaft of supporting elements carried by said shaft and adapted to articulate relative thereto, the axes of articulation being spaced from each other and from the shaft and arranged in a row concentric with said shaft, and beaters on said supporting elements.

5. In a hog-beater shaft attachment, beater supports adapted to be hingedly mounted on a shaft and each formed with a curved outer portion presenting a convex forward face, and flexible beaters mounted on said supports and adapted to flex in contact with said convex faces.

6. A hog-beater shaft attachment, comprising, in combination with a driven shaft, a plurality of drum sections adapted to be arranged in sequence around said shaft, each of said drum sections being formed at its ends with portions extending outwardly substantially radially of the shaft and in contact with similar end portions of adjacent sections, means for clamping said end sections together to secure the sections on said shaft, one end portion of each of said sections projecting a considerable distance beyond the other; and beater devices hinged to the projecting ends of said drum sections.

Signed at Sioux City, in the county of Woodbury and State of Iowa, this 29th day of November, 1919.

F. G. CARPENTER.